US009965056B2

(12) United States Patent
Gordon et al.

(10) Patent No.: US 9,965,056 B2
(45) Date of Patent: May 8, 2018

(54) ACTIVE STYLUS AND CONTROL CIRCUIT THEREOF

(71) Applicant: FiftyThree, Inc., New York, NY (US)

(72) Inventors: Gary Gordon, Snoqualmie, WA (US); Ronald Randall, Monroe, WA (US)

(73) Assignee: FIFTYTHREE, INC., Seattle, WA (US)

( * ) Notice: Subject to any disclaimer, the term of this patent is extended or adjusted under 35 U.S.C. 154(b) by 184 days.

(21) Appl. No.: 15/058,598

(22) Filed: Mar. 2, 2016

(65) Prior Publication Data

US 2017/0255281 A1    Sep. 7, 2017

(51) Int. Cl.
*G06F 3/0354*    (2013.01)
*G06F 3/044*    (2006.01)

(52) U.S. Cl.
CPC .......... *G06F 3/03545* (2013.01); *G06F 3/044* (2013.01)

(58) Field of Classification Search
CPC ............................. G06F 3/044; G06F 3/03545
See application file for complete search history.

(56) References Cited

U.S. PATENT DOCUMENTS

| | | | |
|---|---|---|---|
| 4,686,332 A | 8/1987 | Greanias et al. | |
| 5,212,646 A | 5/1993 | McMurty | |
| 5,475,401 A | 12/1995 | Verrier et al. | |
| 5,565,632 A | 10/1996 | Ogawa | |
| 5,793,360 A | 8/1998 | Fleck et al. | |
| 5,828,011 A * | 10/1998 | Partow ................ | G06F 3/03545 178/19.01 |
| 5,905,430 A | 5/1999 | Yoshino et al. | |
| 6,882,340 B2 | 4/2005 | Kanzaki et al. | |
| 7,202,862 B1 | 4/2007 | Palay et al. | |
| 8,063,322 B2 | 11/2011 | Katsurahira | |
| 8,350,166 B2 | 1/2013 | Baba | |
| 8,576,203 B2 | 11/2013 | Nakata et al. | |
| 8,638,320 B2 | 1/2014 | Harley et al. | |
| 2003/0071798 A1 | 4/2003 | Baron et al. | |
| 2004/0140962 A1 | 7/2004 | Wang et al. | |
| 2009/0153525 A1 | 6/2009 | Chang | |
| 2009/0262637 A1 | 10/2009 | Badaye et al. | |

(Continued)

FOREIGN PATENT DOCUMENTS

WO    2015013533 A2    1/2015
WO    2015013537 A2    1/2015

OTHER PUBLICATIONS

Final Office Action for U.S. Appl. No. 14/340,264, filed Jul. 24, 2014, dated May 19, 2016, 39 pgs.

(Continued)

*Primary Examiner* — Shaheda Abdin
(74) *Attorney, Agent, or Firm* — Stoel Rives, LLP

(57) ABSTRACT

The present disclosure provides systems and methods for receiving an input signal from a touch-sensitive interface via a first electrode associated with a tip of an active stylus. An input signal may be amplified via a control circuit that adjusts the gain of one or more amplifiers to compensate for changes in tip capacitance between the tip of the active stylus and the touch-sensitive interface. Changes in tip capacitance may be indirectly detected and compensated for by comparing the tip capacitance with that of a reference capacitor via a differential amplification circuit that includes one or more differential amplifiers.

24 Claims, 8 Drawing Sheets

(56) References Cited

U.S. PATENT DOCUMENTS

| | | | |
|---|---|---|---|
| 2011/0304577 A1 | 12/2011 | Brown et al. | |
| 2012/0019488 A1 | 1/2012 | McCarthy | |
| 2012/0044140 A1 | 2/2012 | Koyama et al. | |
| 2012/0105362 A1* | 5/2012 | Kremin | G06F 3/03545 345/174 |
| 2012/0146957 A1 | 6/2012 | Dunagan | |
| 2012/0154340 A1 | 6/2012 | Vuppu et al. | |
| 2012/0293454 A1 | 11/2012 | Tsai et al. | |
| 2012/0293464 A1 | 11/2012 | Adhikari | |
| 2012/0327044 A1 | 12/2012 | Zeliff et al. | |
| 2012/0327045 A1 | 12/2012 | Skinner | |
| 2012/0331546 A1 | 12/2012 | Falkenburg et al. | |
| 2013/0038579 A1 | 2/2013 | Boyd et al. | |
| 2013/0100086 A1 | 4/2013 | Kim | |
| 2013/0106793 A1 | 5/2013 | Lai | |
| 2013/0141400 A1 | 6/2013 | Chen et al. | |
| 2013/0257777 A1 | 10/2013 | Benko et al. | |
| 2013/0257793 A1 | 10/2013 | Zeliff et al. | |
| 2013/0327044 A1 | 12/2013 | Portolese et al. | |
| 2014/0062968 A1 | 3/2014 | Skinner | |
| 2014/0092055 A1* | 4/2014 | Radivojevic | G06F 3/016 345/174 |
| 2014/0146018 A1 | 5/2014 | Yang | |
| 2014/0300585 A1 | 10/2014 | Dowd et al. | |
| 2015/0029161 A1 | 1/2015 | Koo | |
| 2015/0029162 A1 | 1/2015 | Harris et al. | |

OTHER PUBLICATIONS

Final Office Action for U.S. Appl. No. 14/340,287, filed Jul. 24, 2014, dated Mar. 15, 2016, 21 pgs.
Final Office Action for U.S. Appl. No. 14/340,345, filed Jul. 24, 2014, dated Mar. 29, 2016, 24 pgs.
International Preliminary Report on Patentability for corresponding International Application No. PCT/US2014/048064, dated Feb. 4, 2016, 7 pgs.
International Preliminary Report on Patentability for PCT/US2014/048053 filed Jul. 24, 2014, dated Apr. 2, 2015, 8 pgs.
International Search Report and Written Opinion for corresponding International Application No. PCT/US2014/048053, dated Apr. 2, 2015, 10 pgs.
International Search Report and Written Opinion for corresponding International Application No. PCT/US2014/048064, dated Apr. 2, 2015, 9 pgs.
Non-Final Office Action for U.S. Appl. No. 14/340,264, filed Jul. 24, 2014, dated Jan. 25, 2016, 41 pgs.
Non-Final Office Action for U.S. Appl. No. 14/340,287, filed Jul. 24, 2014, dated Sep. 22, 2015, 17 pgs.
Non-Final Office Action for U.S. Appl. No. 14/340,345, filed Jul. 24, 2014, dated Aug. 26, 2015, 18 pgs.
Pixelpoint™ Technology. Retrieved Jun. 23, 2014, from http://www.adonit.net/pixelpoint, 3 pgs.
Wabcom Global, Intuos Creative Stylus, (Jan. 1, 2013). Retrieved Jun. 23, 2014, from http://www.wacom.com/en/us/creative/intuos-creative-stylus, 23 pgs.
Wacom Global, Intuos Pen & Touch Tablets. Retrieved Jun. 23, 2014, from http://www.wacom.com/en/us/creative/intuos-s, 19 pgs.
Patently Apple, Apple Secretly Filed Three Dynamic Smart Pen Patents in Europe that are Chock Full of Cool Ideas. Retrieved May 8, 2013, from, http://www.patentlyapple.com/patently-apple/2013/02/apple-secretly-filed-three-dynamic-smart-pen-patents-in-europe-that-are-chock-full-of-cool-ideas.html, 20 pgs.

* cited by examiner

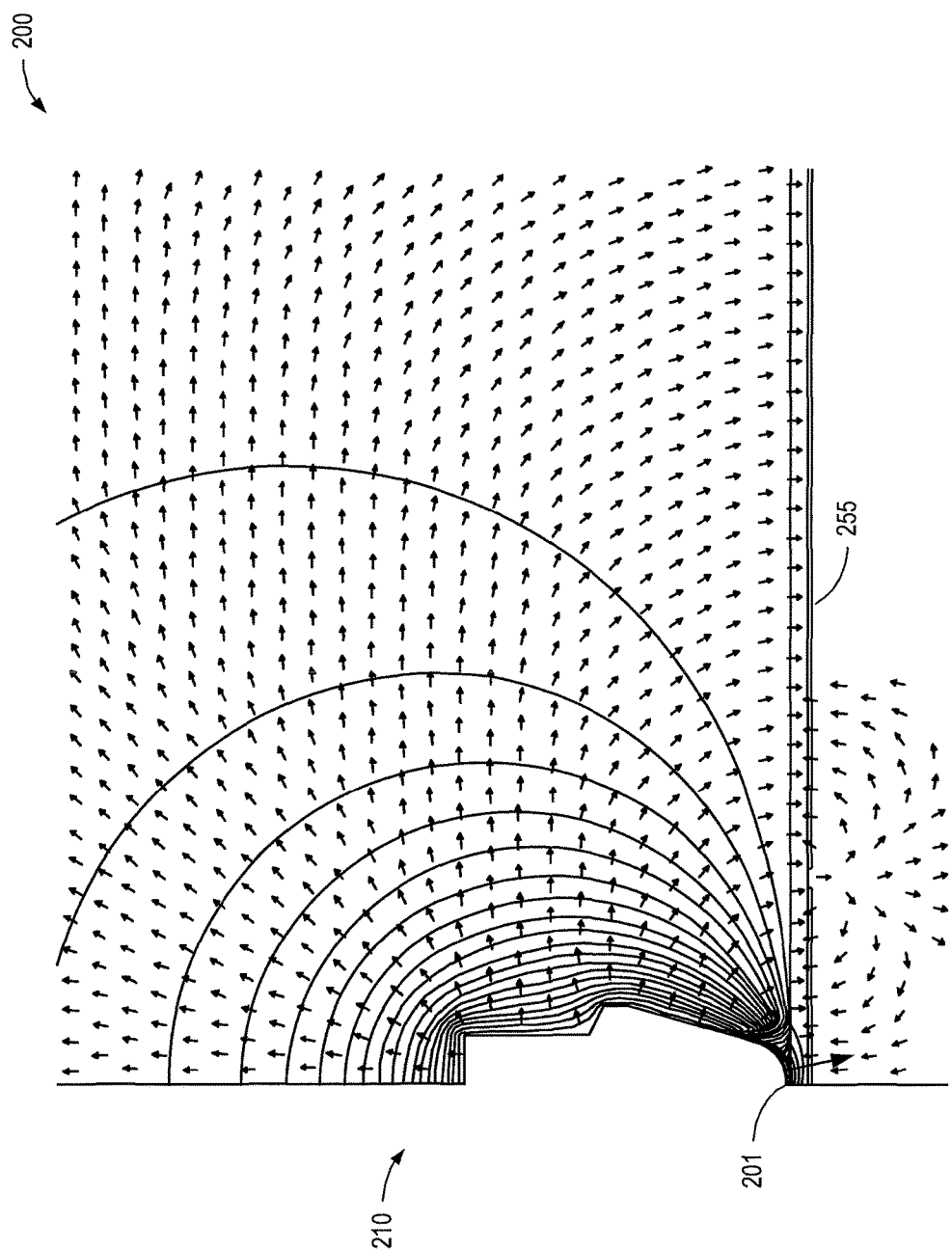

ACTIVE STYLUS AND CONTROL CIRCUIT THEREOF

TECHNICAL FIELD

The present disclosure relates generally to styli for touch screen devices. More particularly, the present disclosure relates to an active stylus and a control circuit thereof.

BRIEF DESCRIPTION OF THE DRAWINGS

Non-limiting and non-exhaustive embodiments of the disclosure are described herein, including various embodiments of the disclosure illustrated in the figures listed below.

FIG. 2A illustrates a simulated electric field between a tip electrode and a relatively distant second electrode of an active stylus in contact with a touch-sensitive interface, according to one embodiment.

DETAILED DESCRIPTION

Figure 1:
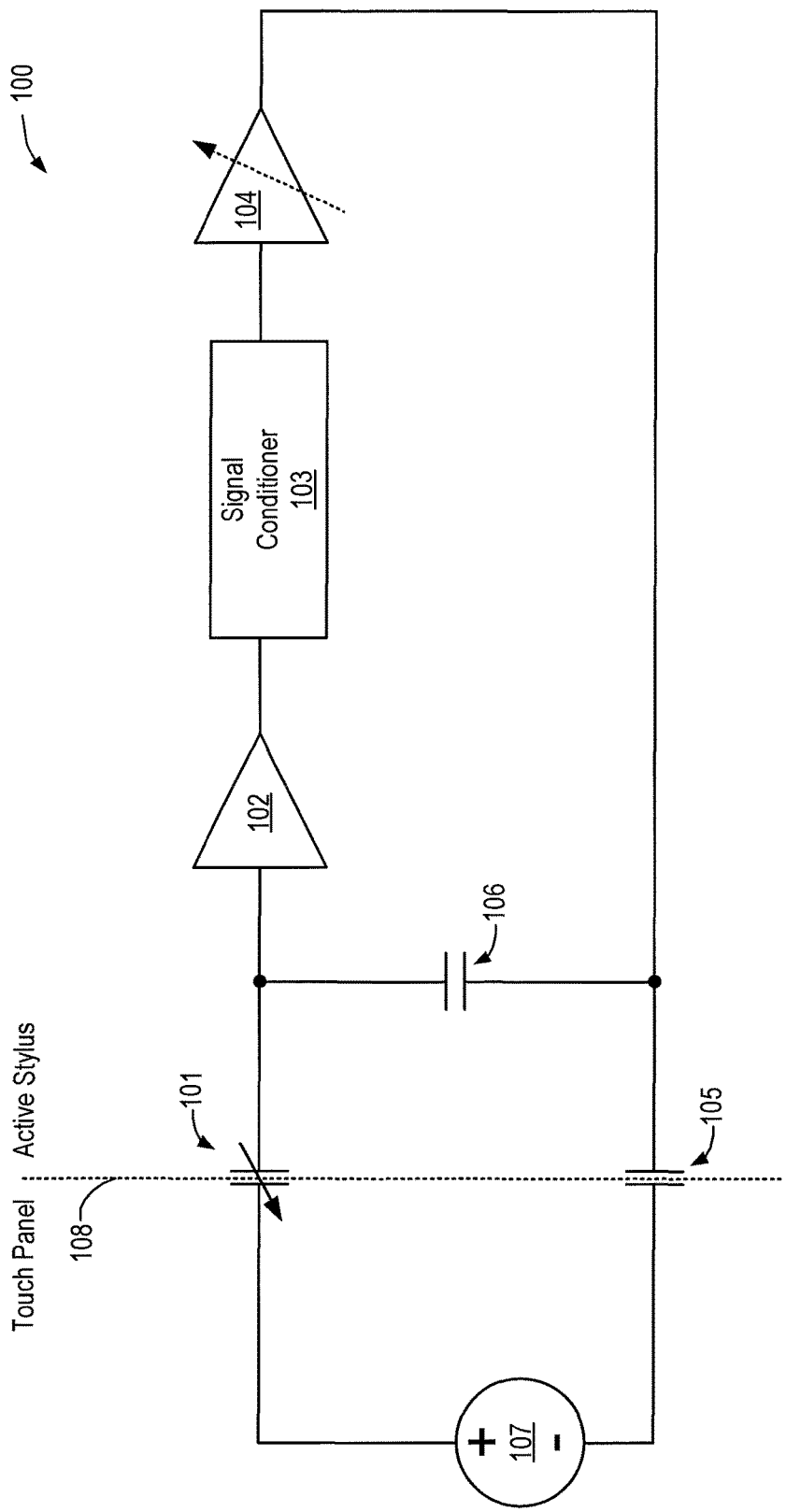
FIG. 1 illustrates a block diagram of an active stylus in electrical communication with a capacitive touch-sensitive interface, according to one embodiment.

According to various embodiments of the presently described systems and methods, an active stylus is provided in which a control circuit compensates for changes in capacitance by adjusting a feedback circuit. The active stylus may utilize a tip as both an electrode for receiving a signal from a touch-sensitive interface and for driving an amplified signal produced by the control circuit.

A second electrode may be used as a common reference point for the control circuit, effectively functioning as a signal ground. The second electrode may include a large portion of the body of the active stylus, allowing the second electrode to also serve as an electromagnetic interference (EMI) shield for the control circuit. EMI received by the body of the stylus, or second electrode, would effectively become common mode noise that is canceled out by the control circuit.

A tip capacitance may be defined as the series combination of the capacitance between the second electrode and the touch-sensitive interface and the capacitance between the tip electrode and the touch-sensitive interface. The tip capacitance may therefore vary significantly based on a wide variety of factors, including: (1) the angle at which the active stylus is held relative to the touch-sensitive display, (2) the pressure at which a flexible tip is pressed against the touch-sensitive display, and (3) the attributes of the touch-sensitive display, such as the dielectric constant of the protective covering (e.g., glass surface) of a touch-sensitive interface. Assuming the second electrode is relatively distant from the tip electrode, changes in the capacitance between the tip and the touch-sensitive interface will be the primary contributor to changes in the tip capacitance.

A reference capacitor within the control circuit may have a fixed value that can be used to indirectly measure and/or compensate for changes in the tip capacitance. A difference amplifier may be used to indirectly compensate for imbalances between the variable tip capacitance and the fixed reference capacitance of the reference capacitor. The imbalance between the two capacitances may be indirectly corrected by adding or subtracting a certain amount of current (as a signal with a phase, frequency, and magnitude) across the reference capacitance to the signal across the tip capacitance (i.e., the signal received from the touch-sensitive interface) until the difference between them is zero. The magnitude of the correction is proportional to the difference in capacitance between the reference and the tip capacitances. The control circuit can periodically or continuously update the correction amount.

The control circuit includes a feedback loop that utilizes the tip electrode to receive an input signal from a touch-sensitive interface and also drive an amplified signal (drive signal). The drive signal driven at the tip electrode is seen or registered by the touch-sensitive interface as if the tip electrode had a much larger capacitance than it really does. For example, the drive signal at the tip electrode may be seen or registered by the touch-sensitive interface as if the tip electrode had a capacitance equivalent to that of a human finger.

Because the tip electrode is both an input to the feedback amplification control circuit and used to drive the amplified output of the control circuit (the drive signal), the control circuit must ensure that a positive feedback loop is not created in which the drive signal is continuously amplified and re-amplified to the point that the control circuit is saturated, begins to oscillate, and/or is otherwise destabilized.

A differential amplifier may be used as an input to an amplification portion of the control circuit to ensure that only the input signal received by the tip electrode from the touch-sensitive interface is amplified by the control circuit, and not the drive signal. As detailed below, if the tip capacitance is equal to the reference capacitance, the output of the differential amplifier will be equal to the signal received by the tip electrode from the touch-sensitive display. That is, the drive signal is canceled out. If the tip capacitance is not equal to the reference capacitance, then the output of the differential amplifier will include a composite waveform that is a function of the difference between the drive signal and the input signal from the touch-sensitive interface. The composite waveform is a function of the amplitude and phase of the input signal and the drive signal provided to the positive and negative terminals of the differential amplifier.

When the tip capacitance is equal to the reference capacitance, the composite waveform will include only the input signal received by the tip electrode from the touch-sensitive interface, because the drive signal is canceled out. When the tip capacitance is not equal to the reference capacitance, the composite waveform will include a function of the input signal and the drive signal. The composite waveform can be fed as one input of a second differential amplifier.

The other input to the second differential amplifier can be an amplified version of the drive signal with a gain corresponding to the difference between the tip capacitance and the reference capacitance. In some embodiments, an amplified version of the drive signal may be attained by passing the drive signal through an amplifier with a gain set by a microcontroller. The gain may be more or less than unity, depending on the imbalance in capacitance.

The gain may be set so that the output of the second differential amplifier will eliminate the drive signal. That is, the gain of the amplified drive signal fed into the second differential amplifier can be set so that the output of the second differential amplifier is approximately equal to the input signal received by the tip electrode from the touch-sensitive interface—the drive signal having been completely or nearly completely eliminated.

The output of the second differential amplifier can be amplified via solid state or analog amplification. A solid state or analog transformer may increase the voltage of the amplified output of the second differential amplifier to produce the drive signal that is then driven by the tip electrode. As previously described, the second electrode of the active stylus that completes the circuit with the touch-sensitive display and serves as a common reference or ground reference for the control circuit may be the body of the active stylus or other discrete conductive portion of the active stylus.

In many of the embodiments described herein, the term "tip electrode" may refer to a single electrode associated with a tip of an active stylus. In some embodiments, the term "tip electrode" may be used to described a plurality of electrodes associated with a tip. In embodiments in which a plurality of electrodes are used to represent the tip electrode, the capacitance of the tip electrode may be an average value of multiple tip capacitances. An electrode associated with the tip of an active stylus may be treated as or referred to as a single electrode even though the "tip electrode" includes a plurality of sub-electrodes whose average capacitance determines the tip capacitance.

As discussed above, the amplified version of the drive signal that is fed into the second differential amplifier may be generated by passing the drive signal through an amplifier with a gain set by a microcontroller. The microcontroller may utilize a phase detector and/or an RF detector at the output of the second differential amplifier to determine what this gain should be.

In other embodiments, additional discrete electronic components, potentially including additional differential amplifiers, may be used to eliminate the drive signal from being re-amplified. These discrete electronic components may be used instead of a microcontroller.

The phrases "connected to" and "in communication with" include any form of communication between two or more components, including mechanical, electrical, magnetic, and electromagnetic interaction. Two components may be connected to or in communication with each other, even though they may not be in direct contact with each other, and/or even though there may be intermediary devices between the two components.

As used herein, the term "touch-sensitive interface" may relate to any of a wide variety of capacitive touch panels or capacitive digitizers that are employed on any of a wide variety of peripheral input devices for electronic devices and/or as a component of a touch screen display. The term "electronic device" may refer to any of a wide variety of wireless or wired electronic devices capable of data communication, including sensors, controllers, monitors, communication devices, personal electronic devices, computers, laptops, tablets, personal computers, network devices, routers, hubs, switches, network node devices, network host devices, control devices, and the like.

Some of the infrastructure that can be used with embodiments disclosed herein is already available, such as: general-purpose computers, computer programming tools and techniques, digital storage media, and communications networks. An electronic device may include a processing unit, such as a microprocessor, a microcontroller, logic circuitry, or the like. The processing unit may include a special-purpose processing device, such as an ASIC, a PAL, a PLA, a PLD, an FPGA, or other customized or programmable device. Accordingly, as used herein the terms "processor," "microcontroller," and "microprocessor" should be broadly understood to include any of a wide variety of hardware, firmware, and/or software combinations capable of executing instructions, whether encoded in hardware or software, and may be used interchangeably in many instances.

Aspects of certain embodiments described herein may be implemented as software modules or components. As used herein, a software module or component may include any type of computer instruction or computer executable code located within or on a computer-readable storage medium located locally or remotely. A software module may, for instance, comprise one or more physical or logical blocks of computer instructions, which may be organized as a routine, program, object, component, data structure, etc., that performs one or more tasks or implements particular abstract data types. Similarly, hardware modules may include any of a wide variety of electrical, mechanical, and/or biological components. Thus, a module in general may refer to any combination of software, hardware, and/or firmware components configured to function a particular way. Any of a wide variety of programming languages and/or hardware architectures may be utilized in conjunction with the various embodiments described herein.

In some cases, well-known features, structures, or operations are not shown or described in detail. Furthermore, the described features, structures, or operations may be combined in any suitable manner in one or more embodiments. It is also understood that the components of the embodiments, as generally described and illustrated in the figures herein, could be arranged and designed in a wide variety of different configurations. In addition, the steps of a method do not necessarily need to be executed in any specific order, or even sequentially, nor need the steps be executed only once, unless explicitly specified or infeasible otherwise.

The embodiments of the disclosure may be understood by reference to the drawings, wherein like parts are designated by like numerals throughout. The components of the disclosed embodiments, as generally described and illustrated in the figures herein, could be arranged and designed in a wide variety of different configurations. Any of the various embodiments described herein may be combined in whole or in part with any other embodiment described herein.

FIG. 1 illustrates a block diagram 100 of an active stylus (right side of dashed line 108) in electrical communication with a capacitive touch-sensitive interface (left side of dashed line 108), according to one embodiment. In the illustrated embodiment, a capacitive touch-sensitive interface is represented as a touch panel voltage or signal source 107. The dashed line 108 can be understood as a dielectric separating the touch-sensitive interface from being directly contacted. For example, a portable electronic device may include a display (e.g., LED, OLED, LCD, etc.), a touch-sensitive digitizer (e.g., a capacitive touch screen), and a dielectric protective surface (e.g., glass, polycarbonate, sapphire, acrylic, etc.).

A tip electrode of the active stylus is represented by a capacitor 101 that is formed by the signal source 107 of the touch-sensitive interface, the dielectric contact medium (e.g., glass), and the tip electrode of the active stylus. In various embodiments, the tip electrode (capacitor 101) receives a signal from the touch-sensitive interface (signal source 107). The signal may be amplified by an amplifier 102. In some embodiments, the amplified signal from the amplifier 102 may be optionally conditioned by a signal conditioner 103. The signal conditioner 103 may modify the phase or timing of the amplified signal from the amplifier 102.

In some embodiments, the amplifier 102 may be combined with the signal conditioner 103 as a signal charge integration amplifier. Additionally, an automatic gain control 104 may adjust the amplitude of the signal to a predetermined level to accommodate changes in signal amplitude that result from variable tip capacitance 101 or changes in the signal source 107.

The amplified (at 102), conditioned (at 103), and adjusted (at 104) signal received by the tip electrode 101 from the touch-sensitive interface (at 107) through the dielectric 108 is returned to the touch-sensitive interface (at 107) through a return electrode 105 of the active stylus. A capacitor 106 in the block diagram 100 represents the inherent parasitic capacitance between the tip electrode 101 and the return electrode 105.

As previously described, the tip electrode 101 may be an exposed conductive material having a small surface area. In some embodiments the tip electrode 101 may be covered by a thin layer of dielectric material. In some embodiments, the return electrode 105 is formed as a conductive body of the stylus. For example, the body of the stylus may be conductive and formed as a cylinder or other shape used for writing utensils (e.g., hexagonal, carpenter's pencil, cylindrical with a flat/concave/convex side, etc.).

In other embodiments, the return electrode 105 may be a conductive portion of the body of the stylus or a separate conductive element of sufficient surface area and proximity to the tip electrode 101 to function as the return electrode 105.

The parasitic capacitance between the tip electrode 101 and the return electrode 105 (represented by the capacitor 106) results in some of the return current from the amplified (at 102), conditioned (at 103), and adjusted (at 104) signal to leak back into the amplifier 102 as feedback.

In the illustrated embodiment, the feedback leakage current through the parasitic capacitor 106 may result in destabilization of the control circuit of the stylus. This may result in current oscillations through the circuit that may be erratically and/or erroneously by the touch-sensitive interface. One approach to avoid this destabilization is to reduce the parasitic capacitance 106 by shielding the tip electrode 101 from the return electrode 105.

For example, a floating conductive layer may be positioned between the tip electrode 101 and the return electrode 105. The floating conductive layer may be isolated from the circuit by a dielectric layer. Another approach may include connecting the floating conductor to a signal ground of the control circuit. If the parasitic capacitance is sufficiently reduced, oscillation of the control circuit may be minimized or even avoided within certain amplification levels. However, such shielding may increase the mechanical complexity and manufacturing costs of the active stylus. Moreover, many embodiments of floating conductors and/or grounded conductors can minimize parasitic capacitance but cannot entirely eliminate parasitic capacitance.

In general, a smaller tip 101 allows a user to make more precise inputs on a touch-sensitive device. However, a smaller tip 101 receives a smaller signal from the touch-sensitive device (signal source 107), and therefore requires greater amplification by the amplifier 102. As the gain of the amplifier 102 increases, the parasitic capacitance 106 must be reduced or else the circuit will begin to oscillate. Thus, the amount of feedback capacitance 106 may directly influence how small of a tip an active stylus can have before the control circuitry of the active stylus destabilizes.

An active stylus as modeled in FIG. 1 cannot distinguish between changes in amplitude of a signal provided by the signal source 107 and changes in amplitude of the signal due to changes in tip capacitance 101. That is, the control circuit illustrated in FIG. 1 cannot distinguish between signal amplitude changes due to (1) the signal source 107 increasing in amplitude and (2) increased capacitance 101 due to, for example, the tip electrode 101 being held at an angle that increases the surface area of the tip electrode 101 that is contacting the dielectric 108.

FIG. 2A illustrates a simulated electric field 200 between a tip electrode 201 and a relatively distant second electrode (not shown) of an active stylus 210 in contact with a touch-sensitive interface 255, according to one embodiment. As illustrated, a uniform field gradient is achieved when the second electrode is sufficiently spaced from the tip electrode 201 for a given signal amplitude.

Figure 2B:
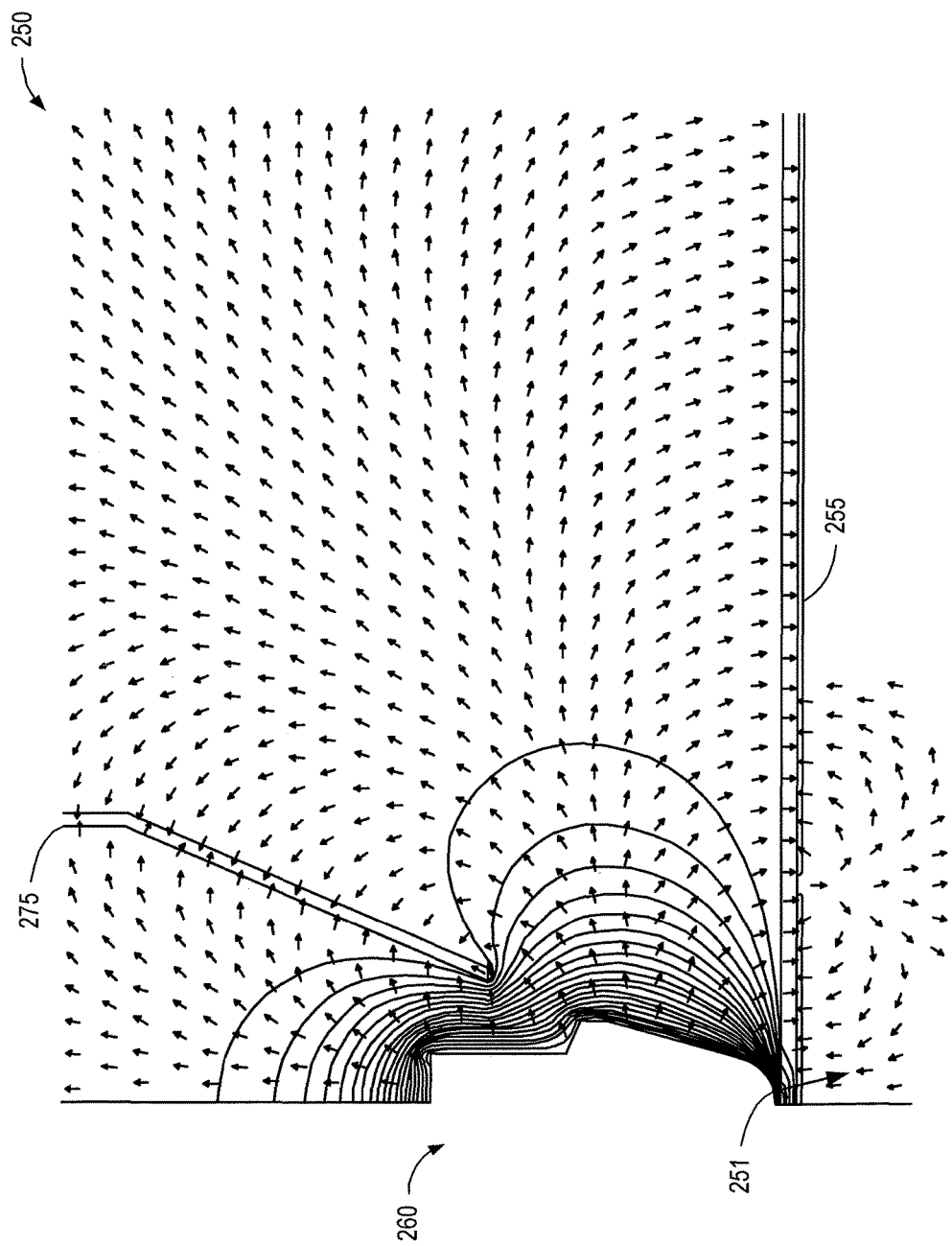
FIG. 2B illustrates a simulated electric field between a tip electrode and a relatively close second electrode of an active stylus in contact with a touch-sensitive interface, according to one embodiment.

In contrast, FIG. 2B illustrates a simulated electric field 250 between a tip electrode 251 and a relatively close second electrode 275 of an active stylus 260 in contact with a touch-sensitive interface 255, according to one embodiment. As illustrated, a non-uniform field is caused by the fact that the return path from the bottom of the tip electrode 251 and the return path from the top of the tip electrode 251 are in different directions because the second electrode 275 is relatively close to the tip electrode 251.

The exact spacing between the tip electrode 251 and the second electrode 275 is dependent on the size of each respective electrode and the maximum signal amplitude of the control circuit within the active stylus 260. In various embodiments, the second electrode 275 is spaced sufficiently distant from the tip electrode 251 to achieve a uniform field gradient. The area within which a uniform field gradient is achieved may be selected to correspond to the various portions of the tip electrode 251 that can contact the touch-sensitive interface 255 with the active stylus 260 held at various angles.

Figure 3:
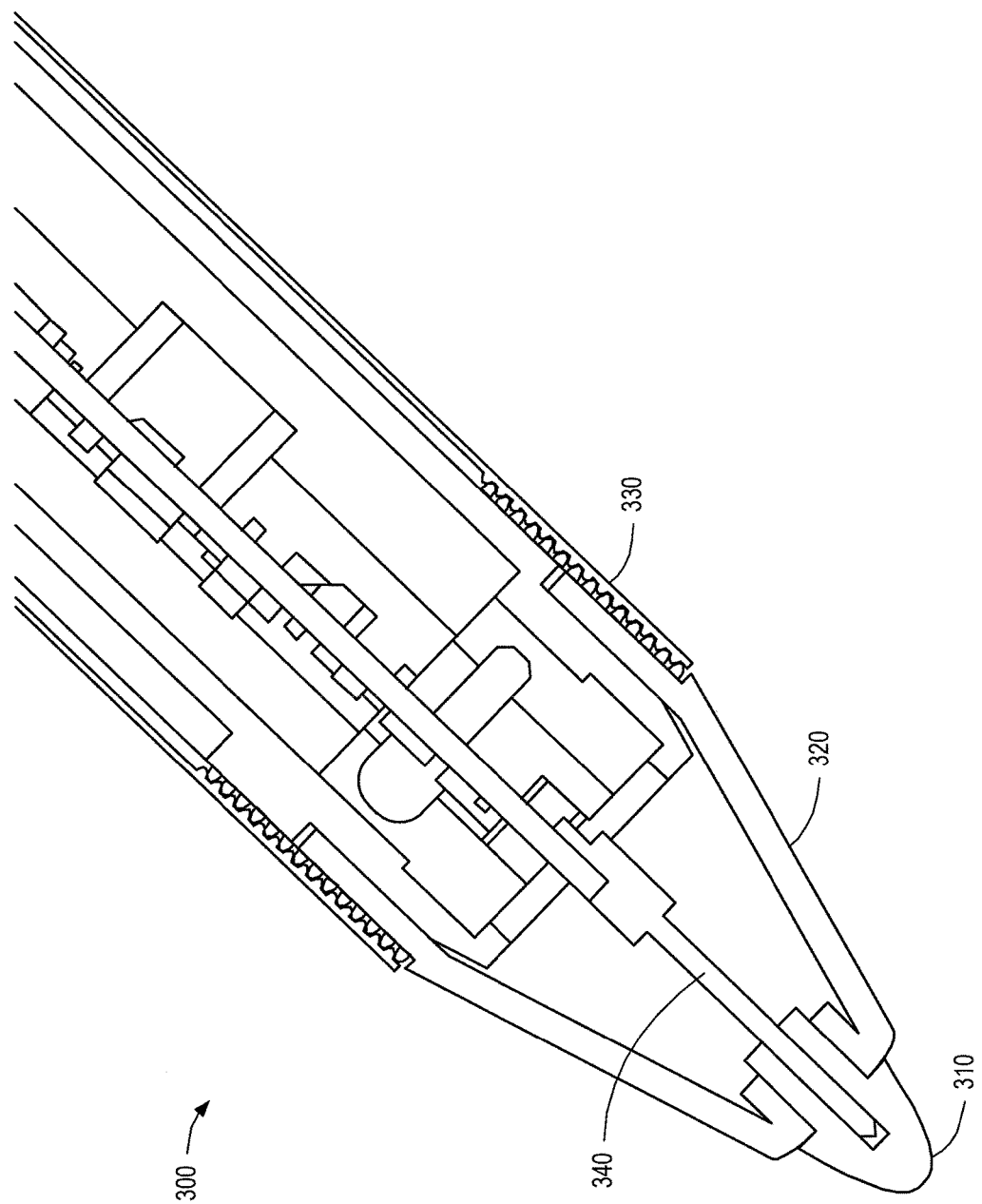
FIG. 3 illustrates an embodiment of an active stylus with a second electrode sufficiently distant from a tip electrode to allow for a uniform electric field.

FIG. 3 illustrates an embodiment of an active stylus 300 with a second electrode 330 sufficiently distant from a tip electrode 310 to achieve a uniform electric field. A dielectric cone 320 separates the tip electrode 310 from the second electrode 330. In the illustrated embodiment, the tip electrode 310 is sufficiently spaced from the second electrode 330 to achieve a uniform electric field in the proximity of the tip electrode 310 near a touch-sensitive interface, regardless of the angle at which the active stylus 300 is held relative to the touch-sensitive interface.

Figure 5:
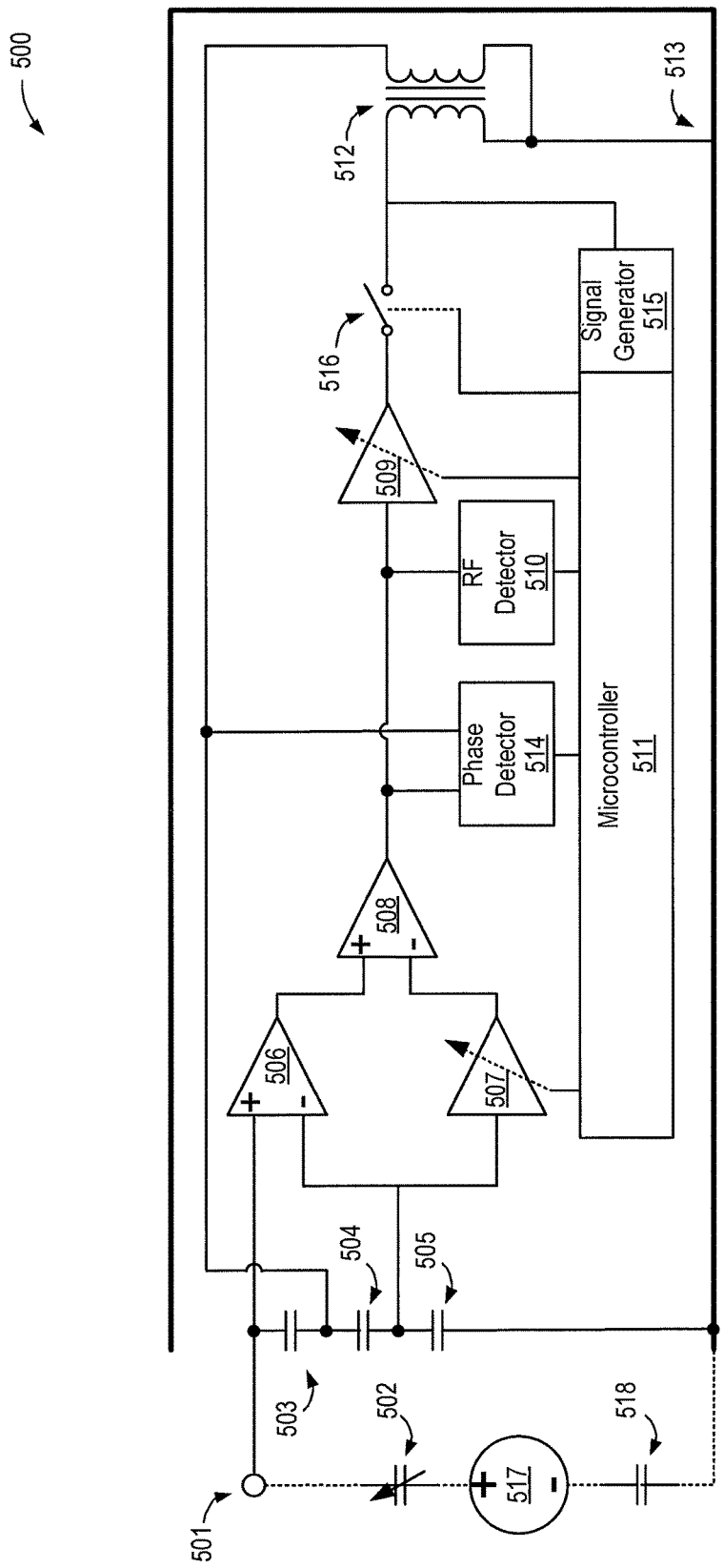
FIG. 5 illustrates one embodiment of a control circuit for an active stylus that compares a tip capacitance with a reference capacitance.
Figure 6:
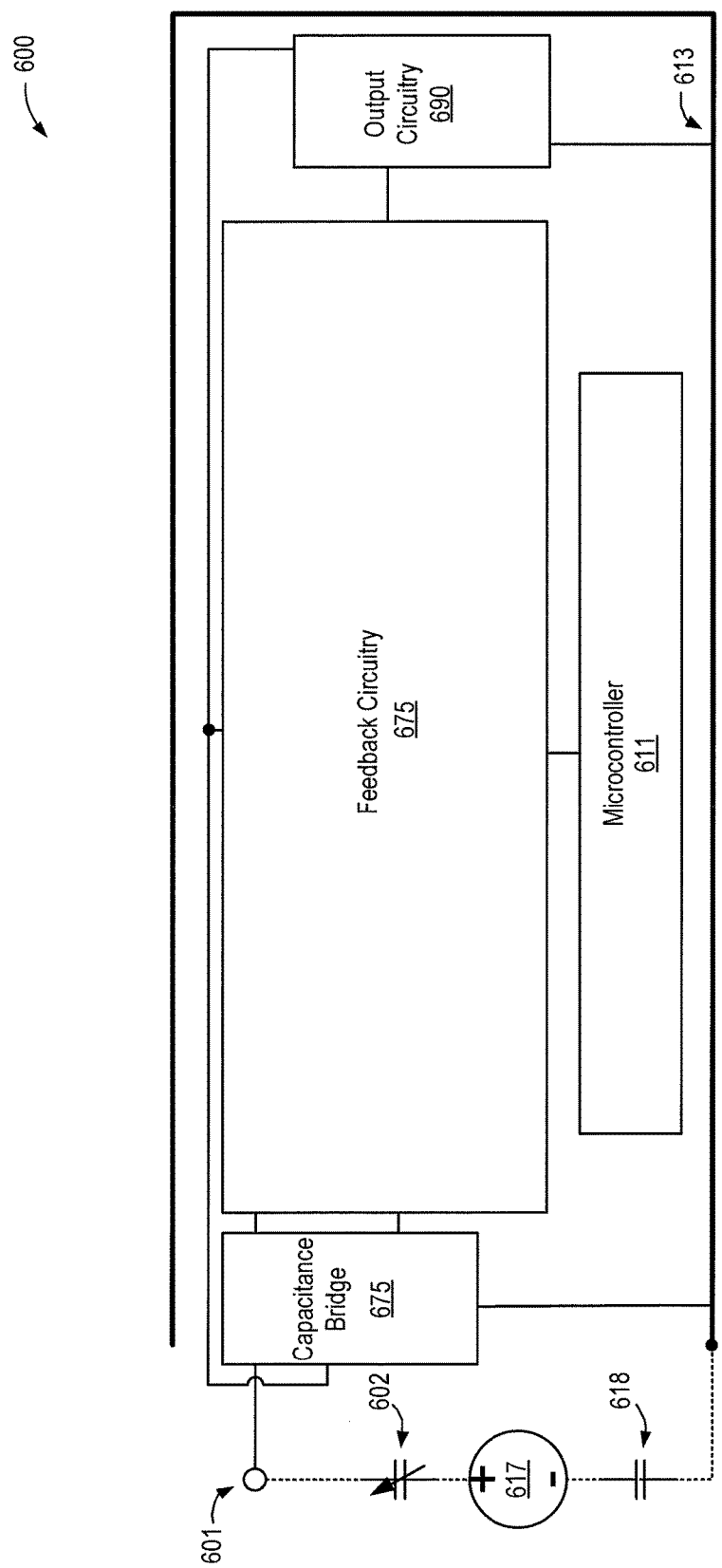
FIG. 6 illustrates a block diagram of a control circuit for an active stylus that compensates for a difference between a tip capacitance and a reference capacitance.

The active stylus 300 includes a conductive pin 340 connecting the tip electrode 310 to a control circuit, such as one of the control circuits described in one of FIGS. 1, 5, and 6. As described above, the tip electrode 310 may be rigid or soft and may be coated or partially coated in a dielectric material that is rigid or soft. The second electrode 330 may comprise the entire outside body of the active stylus 300, or just a portion thereof. In other embodiments, the second electrode 330 is a separate element from the body of the active stylus 300. In various embodiments, the second electrode 330 may be a common or ground reference for the control circuit of the active stylus 300.

As generally described above, the spot size produced by the active stylus 300 may be consistent regardless of the angle at which the active stylus 300 is held relative to a touch-sensitive interface and the pressure applied to the tip electrode 310. The spot size may even stay the same size when a tip electrode 310 comprises a soft material that can deform and cause an increased capacitance between the tip electrode 310 and the touch-sensitive interface.

The signal received by the tip electrode 310 from a touch-sensitive interface may be amplified by a control circuit that adjusts the gain based on a comparison (indirect or direct) of the capacitance between the tip electrode 310 and the touch-sensitive interface and a reference capacitance. Accordingly, an automatic gain control may not be required for the active stylus 300 to function with a wide variety of electronic devices having touch-sensitive interfaces that produce widely varying input signal amplitudes. Example control circuits that compare a tip capacitance with a reference capacitance are provided in FIGS. 5 and 6.

In some embodiments, the indirect comparison of the tip capacitance with a reference capacitance allows the control circuit to increase or decrease the gain of an amplifier to control a line width, color saturation, line shape, or other marking characteristic. Moreover, in addition to comparing a tip capacitance with a reference capacitance, the active stylus 300 can compensate for changes in tip capacitance. Accordingly, additional shielding or floating electrodes between the tip electrode 310 and the second electrode 330 can be avoided, simplifying construction and manufacturing.

Moreover, the ability of the active stylus 300 to detect small changes in tip capacitance optionally provides a reliable means to detect when the tip is physically contacting the dielectric material (e.g., glass) covering the touch-sensitive interface of an electronic device (e.g., a portable electronic device). The tip capacitance is proportional to the surface area of the tip electrode 310 and the dielectric constant of the dielectric material between the tip electrode 310 and the touch-sensitive interface. The tip capacitance is inversely proportional to the distance the tip electrode 310 is from the touch-sensitive interface electrodes under, for example, a touch panel's glass surface.

The ability of the active stylus 300 to compensate for tip capacitance permits the use of flexible or deformable tip materials, such as elastomer tips. Flexible or deformable tips may provide a different user experience than rigid tips and may be better in some situations. For example, a user may prefer a flexible tip when drawing on the smooth glass surface of a touch screen display.

Flexible tip materials may deform considerably as a user applies pressure against a dielectric material covering the touch-sensitive interface. This can result in a significant increase in the surface area contacting the touch panel and a corresponding increase in tip capacitance. Accordingly, the control circuit of the active stylus 300 may periodically adjust the gain of the return signal based on the tip capacitance to effectively cancel out variations due to tip deformation. The result may be a constant gain and consistent spot size registered on the touch panel, regardless of tip deformation that causes increased tip capacitance.

Orienting the active stylus 300 at a shallow angle may also increase the tip capacitance, especially when the tip has an oblong shape because a larger area of the tip will be in close proximity to the touch-sensitive interface. Again, the control circuit may periodically or continually adjust the gain based on the tip capacitance to maintain a constant current gain and/or consistent spot size. A consistent spot size can thereby be attained even when an oblong tip shape is used instead of a spherical shape. Thus, the comparison of (or compensation of) a tip capacitance relative to a reference capacitance allows for a consistent spot size even when deformable or flexible tip materials are used and/or oblong tip shapes are employed.

Alternatively or additionally, the ability of the active stylus 300 to compare and/or compensate for tip capacitance and parasitic capacitance relative to the reference capacitor provides a way for a control circuit to determine an angle at which a stylus is being held by a user relative to a touch-sensitive interface.

In an embodiment in which the tip material has minimal deformation under pressure, the shape of the tip can be specified such that the capacitance between the tip and the touch panel varies in a predictable manner as the angle varies.

Figure 4:
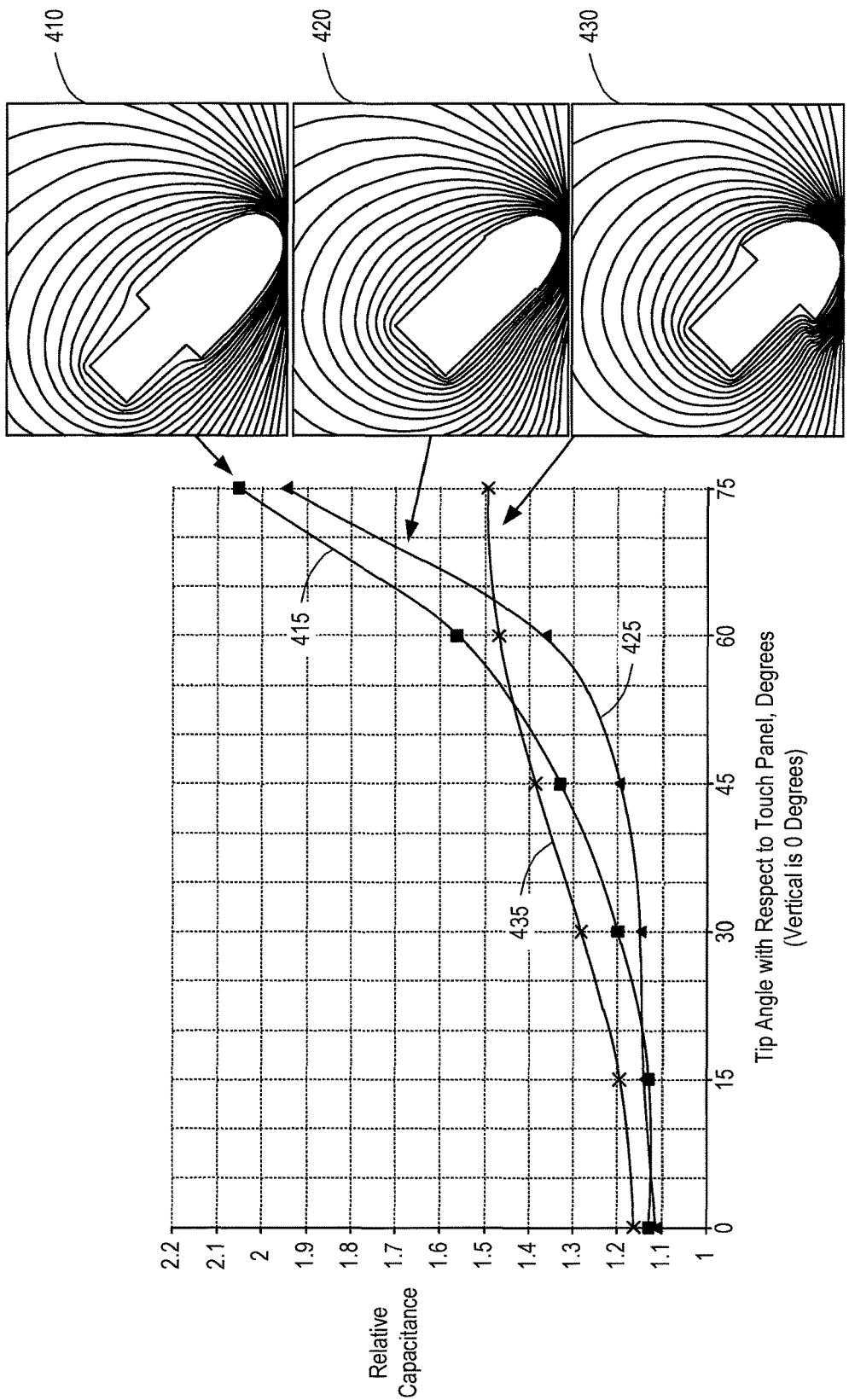
FIG. 4 illustrates three plots that show capacitance values relative to tip angles for each of three different tip shapes.

FIG. 4 illustrates three plots 415, 425, and 435 that show capacitance values (Y-axis) relative to tip angles (X-axis) for each of three different tip shapes 410, 420, and 430, respectively. Plot 415 shows the relative change in capacitance along the Y-axis of a tip shape 410 for various angles between 0 and 75 degrees along the x-axis. Plot 425 shows the relative change in capacitance along the Y-axis of a tip shape 420 for various angles between 0 and 75 degrees along the X-axis. Plot 435 shows the relative change in capacitance along the Y-axis of a tip shape 430 for various angles between 0 and 75 degrees along the X-axis.

For a given tip shape or design, a control circuit may determine an angle at which the tip is being held by a user relative to a touch-sensitive interface based on a tip capacitance (as measured relative to a reference capacitance). In various embodiments, the resulting stylus angle information is transmitted wirelessly to application software associated with the touch-sensitive interface. The application software may utilize the stylus angle information for enhanced features such as drawing wide or thin lines according to the stylus angle.

In other embodiments in which a tip is flexible or deformable, the control circuit may determine the relative pressure applied to the tip by the user. A soft tip of a certain shape made with a conductive elastic material, such as rubber, will deform when pressure is applied. As the pressure increases, the surface area in contact with the dielectric (e.g., glass) will increase and cause an increase in tip capacitance. The change in tip capacitance may be identified by the control circuit as a change in tip pressure and transmitted to application software for enhanced features, such as changing the color density of a drawn line according to pressure.

FIG. 5 illustrates one embodiment of a control circuit for an active stylus 500 that indirectly compares a tip capacitance with a reference capacitance and compensates for any variance. A capacitance 502 may represent the capacitance of a tip electrode 501 of the active stylus relative to an electrode of a signal generator 517 of a touch-sensitive interface. Thus the capacitance 502 is not an additional physical capacitor, but rather an inherent capacitance of the tip with the touch-sensitive interface.

An oscillating voltage generated by the signal generator 517 induces a current flow in the tip electrode 501 of the active stylus 500 through the representative capacitance 502. The capacitance 502 may depend on the shape and orientation of the tip electrode 501, the physical properties of the dielectric material (e.g., glass, sapphire, etc.) covering the touch-sensitive interface, and the conductive properties of the tip electrode 501 and the electrodes of the touch-sensitive interface.

Current induced in the tip electrode 501 by the signal generator 517 of the touch-sensitive interface flows through a measurement capacitor 503, to the secondary of a transformer 512, to the conductive shell or body of the active stylus 500 that serves as a second electrode 513, and through a capacitor 518 to return to the signal generator 517 of the touch-sensitive interface. The capacitor 518 is not a physical capacitor, but rather a representation of the capacitance between the second electrode 513 and the signal generator ground/common electrode(s) of the touch-sensitive interface. The capacitance formed by the series combination of capacitance 518 and capacitance 502 may be referred to as the tip capacitance of the active stylus 500. The tip capacitance 502, 518 may vary based on a variety of factors discussed herein.

The current through the measurement capacitor 503 results in a terminal voltage proportional to the amplitude of the current flowing to and from the signal generator 517 of the touch-sensitive interface. When the transformer 512 is not producing an oscillating voltage, the terminal voltage of a measurement capacitor 504 is approximately zero. This results in an oscillating voltage at the output of a differential amplifier 506 and a differential amplifier 508. The oscillating voltage will be in-phase with the signal from the signal generator 517 of the touch-sensitive interface. This in-phase signal is amplified and inverted by an amplifier 509 and drives the primary of the transformer 512 when a switch 516 is closed. The amplified and inverted signal becomes the drive signal of the active stylus 500 and is fed back to the junction of the measurement capacitors 503 and 504.

The drive signal retains the shape of the input signal, but is amplified and inverted with respect to the input signal from the signal generator 517 of the touch-sensitive interface. It is appreciated that the differential amplifier 508 and the amplification amplifier 509 may be combined into a single operational amplifier configured to amplify the difference between the outputs of the first differential amplifier 506 and a compensation amplifier 507. In still further embodiments, variable resistors connected to a single operational amplifier may be controlled by the microcontroller to allow the amplifiers 506, 507, 508, and/or 509 to be combined into a single operational amplifier with various discrete (and potentially controllable) circuit components connected thereto. For example, an amplified difference configuration may replace at least two of the illustrated operational amplifiers 508 and 509.

The lowest impedance path for this increased current is through the conductive tip electrode 501. Accordingly, the control circuit effectively receives an input current via the tip electrode 501 and multiplies it to produce a drive signal at the tip electrode 501 that is an amplified version of the input current. The touch-sensitive interface registers this increased current as corresponding to a touch by an object with a larger capacitance than that of the tip electrode 501. Specifically, the touch-sensitive interface may register the increased current as corresponding to the capacitance seen by the touch of a human finger.

When the tip capacitance 502, 518 is equal to a reference capacitance 505, the driving current waveform from the transformer 512 passing through the measurement capacitors 503 and 504 are equal in magnitude and phase. The measurement capacitor 503 has an additional current waveform from the signal generator 517 of the touch-sensitive interface superimposed on the driving current waveform. The difference amplifier 506 subtracts the terminal voltages of the measurement capacitors 503 and 504, such that resulting output of the difference amplifier 506 contains only the signal from the signal generator 517 with the component of the drive waveform from the transformer 512 virtually eliminated.

When the tip capacitance is not equal to the reference capacitance 505, the output of the difference amplifier 506 contains a composite waveform that is a function of the drive waveform from the transformer 512 and the signal from the signal generator 517 of the touch-sensitive interface. The phase and magnitude of the composite waveform is a function of the amplitude and phase of the two input waveforms: the waveform on the positive input of the difference amplifier 506, and the waveform on the negative input of the difference amplifier 506.

The signal component of the drive waveform in the output of the difference amplifier 506 may be minimized to prevent unstable oscillation of the feedback loop. A microcontroller 511 may control the gain of the compensation amplifier 507 to compensate for capacitance mismatch between the tip capacitance 502, 518 (which may vary based on any of the factors mentioned herein) and the fixed reference capacitance 505. A capacitance mismatch results in either more or less of the drive waveform present in the output of the difference amplifier 506.

To compensate for the capacitance difference between the tip capacitance 502, 518 and the reference capacitance 505, the gain of the compensation amplifier 507 may be adjusted. The drive signal may be nulled from the output of the difference amplifier 508 by selectively subtracting a fraction of the drive signal taken from the junction of the measurement capacitor 504 and the reference capacitor 505 from the composite output of the difference amplifier 506.

The microcontroller 511 may control the gain of the compensation amplifier 507 to ensure that the drive signal is effectively subtracted out by the difference amplifier 508. The output of the difference amplifier 508 corresponds to the signal from the signal generator 517 of the touch-sensitive interface, compensated for the variable tip capacitance. The tip capacitance may change (e.g., based on a flexible tip being pressed harder or softer, or the active stylus being held at a different angle), such that it is different from that of the reference capacitor 505.

The capacitance difference will manifest as a change in magnitude and/or phase at output of the amplifier 508. An RF detector 510 outputs a lower frequency voltage proportional to the amplitude of the oscillating voltage output from the amplifier 508. The microcontroller 511 reads the output voltage of the RF detector 510 and/or a phase detector 514 to adjusting the gain of the compensation amplifier 507 until the fraction of the driving waveform from the transformer 512 is minimized or eliminated.

The amount of gain applied to the compensation amplifier 507 directly corresponds to the difference between the tip capacitance 502, 518 and the reference capacitance 505. The effective capacitance between the touch-sensitive display and the tip electrode 501 can be continuously monitored by the microcontroller as it continuously adjusts the gain of the compensation amplifier 507 to reduce or eliminate the feedback of the driving waveform from the transformer 512. The known capacitance and properties of the tip electrode 501 of the active stylus 500 can be used to determine tip pressure and/or stylus angle with respect to the touch-sensitive interface.

The microcontroller 511 may also control the gain of the amplifier 509 to adjust the gain of the feedback loop. Accordingly, the microcontroller 511 can adjust the gain of the feedback loop to allow the active stylus 500 to function with any of a wide variety of touch-sensitive interfaces and optionally adjust the touch spot size or shape as it is interpreted by software applications.

In some embodiments, the microcontroller 511 may include a wireless interface that allows it to communicate wirelessly with the application software running on a device associated with the touch-sensitive interface. In such an embodiment, the software application may control over the gain of the feedback loop.

In some embodiments, a signal generator 515 and the switch 516 allow the microcontroller to selectively compensate for changes in the tip capacitance 502, 518. Such compensation may be more precise and/or quicker than would be possible using the unknown waveform from the signal generator 517 of the touch-sensitive interface. The microcontroller 511 may open the feedback loop by opening the switch 516 and then use the signal generator 515 to directly drive the primary of the transformer 512. In such an embodiment, the microcontroller 511 can adjust the gain of the compensation amplifier 507 until the minimum signal level is present at the output of the difference amplifier 508 and/or until the phase comparator is mid-scale. In various embodiments, the transformer 512 may be replaced by any of a wide variety of amplifier circuits.

It is appreciated that in some embodiments, the microcontroller 511 may simply generate the drive signal, obviating the need for the amplifier 509 and/or the switch 516. In other embodiments, the signal generator 515 or the switch 516 may not be included. In still other embodiments, the gain of the amplifier 509 may be fixed and/or adjustable in a manner other than via the microcontroller 511.

For example, an external knob connected to a potentiometer may be used to select a gain setting known to be compatible to each of a plurality of electronic devices. For example, the knob may include settings 1-10, where each setting corresponds to a particular gain of the amplifier 509. The settings 1-10 may allow the active stylus 500 to be used with various electronic devices.

In still other embodiments, the microcontroller 511 may be replaced with discrete circuitry components that utilize information gathered from the phase detector 514 and/or the RF detector 510 to adjust the gain of the compensation amplifier 507 until the output of the difference amplifier 508 eliminates the drive signal. In some embodiments, only one of the phase detector 514 and the RF detector 510 may be utilized.

FIG. 6 illustrates a block diagram of a control circuit for an active stylus 600 that compensates for a difference between a tip capacitance 602, 618 and a reference capacitance. The control circuitry, including a capacitance bridge 675, feedback circuitry, and output circuitry 690 allow the active stylus to separate the signal received from a signal generator 617 of a touch-sensitive interface from the drive signal generated at the output circuitry 690 of the feedback circuitry.

A microcontroller 611 may monitor and control the gain of feedback circuitry 675. The microcontroller 611 may also monitor the difference between the tip capacitance 602, 618 and a reference capacitance to identify an angle at which the active stylus 600 is being held and/or a pressure being applied to a tip 601.

As in other embodiments, the outer housing of the active stylus 600 may serve as a second electrode 613. The second electrode 613 may be spaced sufficiently from the tip electrode 601 to allow for a uniform field gradient.

The programmable gain control of FIGS. 5 and 6 above allows for interoperability across a wide range of touch panels. Some panels may have substantially different signal amplitudes and dielectric (e.g., glass) thickness than others. For example, some mobile phone touch panels have been observed to have lower signal amplitude than larger size tablets or laptop screens.

The gain control may be programmed via wireless communication by a software application executing on a touch device. The software application may have information about the model of touch panel and may communicate with the active stylus and provide an optimal gain for that touch panel device. In other embodiments, the microcontroller may set the gain based on a received signal amplitude, known parameters of a specific touch device, or other programmed or communicated information.

"Wobble" is a term given to a symptom observed when using some active styli when a straight line drawn across a touch panel is registered as an undulating or wobbling line. The deviation from the actual path of a stylus can be caused by the arrangement of conductive electrodes in a capacitive touch panel. The capacitive touch panel may have a large number of electrodes arranged in a regular (or repeating) grid pattern with non-conductive gaps between the electrodes. When a stylus tip moves across multiple distinct electrodes, the signal level decreases when the tip is between electrodes. Moreover, various signal level fluctuations may occur based, at least partially, on electrode geometries and/or parasitic effects of the touch panel implementation.

The microcontroller in the active stylus described herein can detect a decrease in signal amplitude from a touch screen display distinct from a change in tip capacitance due to tip deformation or angle. Accordingly, the active stylus can adjust the gain of the feedback loop and/or communicate with a software application on the touch screen device to reduce or eliminate the wobble effect.

In various embodiments, the tip of a control circuit may have a high impedance input (e.g., 500K Ohms). Radiated electromagnetic interference (EMI), including common EMI from AC wiring in homes and buildings, may interfere with the control circuit operation. For example, when a portable electronic device with a touch-sensitive display is plugged into an AC outlet for charging, the EMI from AC wiring may interfere with a stylus.

In various embodiments, the body or outer housing of the active stylus serves as both the second electrode and as a common or ground reference for the control circuit. As the body of the active stylus is relatively large compared to the tip electrode, it will receive the largest percentage of EMI. Because the control circuit in these embodiments utilizes the body of the active stylus as a common or ground reference, the impact of the EMI is reduced or eliminated.

In various embodiments, the active stylus does not incorporate any intermediate exposed conductors that are at a different potential than a common reference. As previously described, in various embodiments the first electrode is the tip and the second electrode is the body of the stylus which is the common "signal ground." In such an arrangement, the second electrode or body of the stylus effectively serves as a shield for the control circuit. EMI signals received by the body of the active stylus will appear primarily as common-mode noise on other circuit nodes and will not impact the function of the circuit. In such embodiments, the tip electrode is used to receive current from the touch-sensitive interface and to drive the amplified return current to the touch-sensitive interface, which allows the second electrode (optionally the body of the active stylus) to serve as a common reference point or signal ground from the control circuit.

In contrast, some embodiments of an active stylus may use a tip electrode to receive current from a touch panel and a return electrode to return current to the touch panel. In such embodiments, the return electrode cannot serve as a signal ground and thus cannot be a common reference point. Such embodiments may be more susceptible to external EMI sources.

Accordingly, the embodiments illustrated and described in FIGS. 3, 5 and 6 both drive the touch panel current and sense the received current at the tip. As a result, the stylus body can serve as a second electrode that is a signal ground and an EMI shield for the internal control circuit.

In various embodiments, the control circuit illustrated in FIGS. 5 and 6 can provide a relatively high voltage amplification with minimal input power from a low voltage battery. For example, a 3.6 Volt battery might be used to drive 40 Volt output (peak to peak). Batteries with lower or higher voltages may be utilized, and regardless of the input voltage, the circuit may drive higher or lower output voltages.

High voltages may be utilized in combination with non-conductive or low-conductivity tips to reduce the "wobble" phenomenon described above. Non-conductive tips connected to an electrically conductive tip electrode can generally achieve a more uniform electric field distribution than conductive tips. Additionally, non-conductive tips may allow for a broader range of material choices that improve product usability and reliability.

In some embodiments, a boost-voltage regulator may be used to multiply a battery voltage to a desired level needed at the tip. However, a boost voltage regulator may have decreasing efficiency as the multiplication factor increases. Thus, high voltage outputs may be very inefficient. Furthermore, such circuits typically operate continuously to maintain a high voltage level so it will be available when the touch panel column scan occurs.

A user may be using an active stylus at close proximity to a touch-sensitive display for only a relatively small percentage of the usage time. As an example, an active stylus may be used only 10% of the time that it is turned on during a user session. Thus, for 90% of the time the active stylus may be wasting battery energy. In some embodiments, a portion of the stylus circuitry may be powered from the high voltage, further increasing power consumption.

For instance, in at least one embodiment, a touch panel may be implemented with multiple columns of electrodes. Each column may be energized for a short burst in time, followed by the next in sequence as scanning progresses across the screen. For a given position on the panel, the stylus may receive signal for only a fraction of the time it takes for the touch panel to scan the entire screen. For example, a panel may have ten columns and scan the complete screen every ten milliseconds. The stylus would only need to drive a signal when the column underneath its tip is energized, and therefore would only need to be powered for one or two milliseconds out of the full ten milliseconds. Thus, the active stylus may reduce power consumption by only drawing power on demand for only the fraction of each refresh cycle during which the electrodes of the touch sensitive display are active beneath the tip of the active stylus.

According to various embodiments, including those illustrated in FIGS. 3, 5 and 6, a 1.5 to 6 Volt battery may be used to produce a 15 to 60 Volt output without the need for a boost-voltage regulator. For example, 3.6 Volt battery may be used to generate a 40 Volt output. The control circuit itself may utilize the 3.6 Volt power source (or less). Rather than using an inefficient boost-voltage regulator, the high voltage signal may be achieved through the use of coupled inductors with a multiplication factor between 8 and 20.

For example, a 3.6 Volt battery might be used with coupled inductors that provide a multiplication factor of approximately 10 to attain an output voltage of approximately 40 VPP. See for example, the output circuitry 690 of FIG. 6 and the coupled inductors of the transformer 512 of FIG. 5. The advantage of this approach is that power is expended only on demand—during the touch panel column scan event, rather than all of the time. If the active stylus is actually only used 10% of the time during a usage session, the efficiency savings may be very significant.

In another embodiment, the use of a bipolar drive for the coupled inductors may increase the voltage multiplication. A bipolar drive that doubles the multiplication factor of the inductors may multiply the input voltage by, for example, 20 or so. A resulting output voltage of approximately 60 VPP may be attained using a common 3.6 Volt battery.

Figure 7:
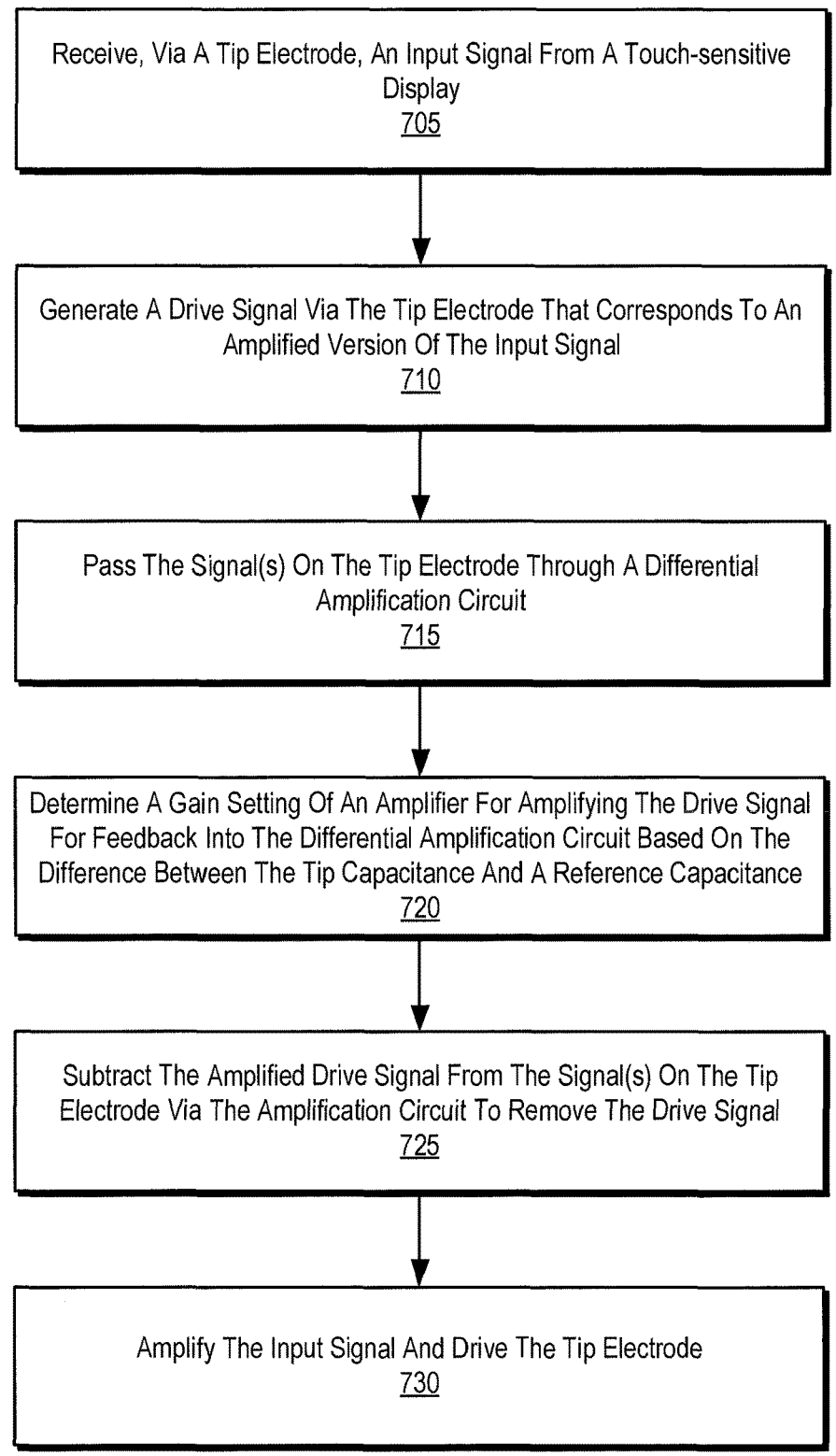
FIG. 7 illustrates a flow chart of a method for generating a drive signal to be driven by a tip electrode of an active stylus.

FIG. 7 illustrates a flow chart of a method for generating a drive signal to be driven by a tip electrode of an active stylus. A tip electrode may be used to receive an input signal from a touch-sensitive display, at 705. The tip electrode may also be used to drive a signal that corresponds to an amplified version of the input signal, at 710. The amplified version of the input signal may be generated using a control circuit. The touch-sensitive display may interpret the drive signal as a touch corresponding to an object having a capacitance that is generally greater than the actual tip capacitance. For example, the drive signal may cause the touch-sensitive display to register a touch similar to a human finger.

The tip electrode may serve as the input to the control circuit where amplification takes place. The input may include one or more measurement capacitors through which the signals on the tip electrode pass. A first portion of the control circuit may include a differential amplification circuit comprising one or more differential amplifiers or equivalent functionality discrete components, at 715. In some embodiments, a capacitance bridge comprising a plurality of capacitors may be employed.

The signals from the tip electrode may include both an input signal from a touch-sensitive interface as well as a drive signal previously generated by the output or amplification circuitry of the control circuit. A microcontroller may determine a gain setting for an amplifier for amplifying the drive signal for subtracting it from the signals on the tip electrode, at 720.

Thus, one input to the differential amplification circuit may be a composite of the input signal and the drive signal. The other input to the differential amplification may be an amplified (unity, less than unity, or greater than unity) drive signal. The gain applied to the amplified drive signal for input into the differential amplification circuit may correspond to the difference between the variable tip capacitance and a reference capacitor.

Accordingly, the gain may be varied depending on the angle at which the tip is being held, the pressure being applied to the tip, the type of touch-sensitive interface being used, the specific characteristics of the electronic device or peripheral input device that has the touch-sensitive interface, etc.

The differential application circuit may serve to subtract the amplified drive signal from the signal on the tip electrode so as to remove the drive signal, at 725. The remaining signal corresponds directly to or may even be equal to the input signal. The input signal is amplified and driven back to the tip electrode, at 730.

Reference throughout this specification to "embodiments," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Any feature or characteristic described in conjunction with one embodiment may be combined with any feature or characteristic of any other embodiment. In is conceivable that an active stylus could be created that includes any combination of all of the features and options described herein, including an active stylus that includes all of the features and options described herein. In such an embodiment, features and characteristics that appear to be mutually exclusive might be combined in a single embodiment but only used independently based on user-selection or control circuitry decision logic.

The claims following this Detailed Description are hereby expressly incorporated into this Detailed Description, with each claim standing on its own as a separate embodiment and every combination of any number of claims standing on its own as another possible embodiment. For example, this disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. Changes may be made to the details of the above-described embodiments without departing from the underlying principles of the invention. The scope of the present application should, therefore, be determined only by the following claims.

What is claimed:

1. A control circuit for an active stylus comprising:
   a first electrode associated with the tip of an active stylus configured to receive an input signal from a touch-sensitive interface and support;
   a capacitive bridge comprising at least three capacitors, including a first capacitor connecting the first electrode to a second capacitor and a reference capacitor connecting the second capacitor to a second electrode;
   a transformer comprising a primary winding and a secondary winding, wherein the secondary winding connects a junction of the first capacitor and the second capacitor to the second electrode;
   a first differential amplifier with a first input connected to the first electrode and a second input connected to a junction of the second capacitor and the reference capacitor;
   a compensation amplifier configured to amplify a signal from the junction of the second capacitor and the reference capacitor; and
   a second differential amplifier with a first input connected to an output of the first differential amplifier and a second input connected to an output of the compensation amplifier,
   wherein the primary winding of the transformer connects the output of the second differential amplifier to the second electrode, and
   wherein the gain of the compensation amplifier is dynamically adjusted based at least partially on a difference between a capacitance of the reference capacitor and a capacitance between the first electrode and the touch-sensitive interface.

2. The control circuit of claim 1, wherein the gain of the compensation amplifier is dynamically adjusted to substantially eliminate a drive signal produced by the control circuit,
   wherein the drive signal corresponds to an amplified version of the input signal that is driven onto the first electrode to cause the touch-sensitive input to register a contact by a tip of the active stylus with the touch-sensitive interface.

3. The control circuit of claim 1, wherein the second electrode comprises a substantial portion of an outer housing of the active stylus.

4. The control circuit of claim 1, wherein the first electrode associated with the tip of the active stylus comprises at least two sub-electrodes.

5. The control circuit of claim 1, wherein the second electrode is a common or ground reference for the control circuit.

6. The control circuit of claim 1, wherein the gain of the compensation amplifier is dynamically adjusted based at least partially on the difference of (1) the capacitance of the reference capacitor and (2) the capacitance between the first electrode and the touch-sensitive interface in series with the capacitance between the second electrode and the touch-sensitive interface.

7. The control circuit of claim 1, further comprising an amplifier with a gain less than 0 between the output of the second differential amplifier and the primary winding of the transformer.

8. The control circuit of claim 7, further comprising a microcontroller configured to control the gain of the amplifier with the gain of less than 0.

9. The control circuit of claim 1, further comprising an amplifier with a gain greater than 0 between the output of the second differential amplifier and the primary winding of the transformer.

10. The control circuit of claim 1, wherein the first electrode is spaced sufficiently from the second electrode to attain a uniform electric field gradient proximate a contact point of the tip of the active stylus with the touch-sensitive interface.

11. The control circuit of claim 1, further comprising a microcontroller configured to control the gain of the compensation amplifier.

12. The control circuit of claim 11, further comprising at least one of a phase detector and an RF detector configured to detect the presence of a drive signal corresponding to an amplified version of the input signal.

13. An active stylus comprising:
   an elongated body comprising an outer housing;
   a tip for contacting a surface of a touch-sensitive device, wherein the tip is associated with a first electrode configured to receive an input signal from an electrode of the touch-sensitive device;
   a second electrode; and
   a control circuit configured to adjust a gain of at least one amplification stage based on a difference in (1) a capacitance of a fixed reference capacitor and (2) tip capacitance, the tip capacitance based at least in part on a capacitance of the first electrode relative to the touch-sensitive device, the control circuit further configured to amplify the input signal to produce a drive signal to be driven at the first electrode, the control circuit comprising:
- a capacitive bridge comprising at least three capacitors, including a first capacitor connecting the first electrode to a second capacitor and a reference capacitor connecting the second capacitor to the second electrode;
- a transformer comprising a primary winding and a secondary winding, wherein the secondary winding connects a junction of the first capacitor and the second capacitor to the second electrode; and
- a drive signal feedback circuit comprising at least one differential amplification stage with one input connected to an output of a gain compensation stage for the drive signal, a gain of the gain compensation stage adjusted based on a difference in the capacitance of a fixed reference capacitor and the tip capacitance such that the drive signal is substantially removed from the output of the differential amplification stage.

14. The active stylus of claim 13, wherein the tip capacitance is based on the capacitance of the first electrode relative to the touch-sensitive device and the capacitance of the second electrode relative to the touch-sensitive device.

15. The active stylus of claim 13, wherein the gain of the at least one amplification stage is adjustable between −1 and 1.

16. The active stylus of claim 13, wherein the gain of the at least one amplification stage is adjustable between 0 and −1.

17. The active stylus of claim 13, wherein the tip comprises a dielectric element connected to the first electrode, where the dielectric element is configured to directly contact the surface of the touch-sensitive device.

18. The active stylus of claim 13, further comprising a microcontroller configured to control the gain of the gain compensation stage to substantially remove the drive signal from the output of the differential amplification stage.

19. The active stylus of claim 18, wherein the microcontroller utilizes inputs from at least one of a phase detector and an RF detector to determine the gain of the gain compensation stage that will result in the drive signal being substantially removed from the output of the differential amplification stage.

20. The active stylus of claim 13, wherein the drive signal feedback circuit comprises:
- a first differential amplifier with a first input connected to the first electrode and a second input connected to a junction of the second capacitor and the reference capacitor;
- a junction of the second capacitor and the reference capacitor providing the drive signal input to the gain compensation stage; and
- a second differential amplifier with a first input connected to an output of the first differential amplifier and a second input connected to an output of the gain compensation stage,
- wherein the primary winding of the transformer connects the output of the second differential amplifier to the second electrode.

21. The active stylus of claim 20, wherein the control circuit comprises an amplifier with a gain less than 0 between the output of the second differential amplifier and the primary winding of the transformer.

22. The active stylus of claim 20, wherein the gain of the at least one amplification stage is dynamically adjusted during operation to substantially eliminate a drive signal produced by the control circuit that is present on the first electrode.

23. The active stylus of claim 20, wherein the second electrode is a common or ground reference for the control circuit.

24. The active stylus of claim 20, wherein the second electrode comprises a substantial portion of the outer housing of the elongated body.

* * * * *